United States Patent [19]
Clark et al.

[11] Patent Number: 5,951,682
[45] Date of Patent: Sep. 14, 1999

[54] START-UP SYSTEM OF A COMPUTER SYSTEM

[75] Inventors: Mark Clark; Michael Dörfle; Winfried Stelzel, all of München, Germany

[73] Assignee: Siemens Aktiengesellschaft, Munich, Germany

[21] Appl. No.: 08/981,263

[22] PCT Filed: Jun. 26, 1996

[86] PCT No.: PCT/EP96/02795

§ 371 Date: Dec. 16, 1997

§ 102(e) Date: Dec. 16, 1997

[87] PCT Pub. No.: WO97/01815

PCT Pub. Date: Jan. 16, 1997

[30] Foreign Application Priority Data

Jun. 28, 1995 [DE] Germany ............................ 95110106

[51] Int. Cl.$^6$ ........................................... G06F 17/30
[52] U.S. Cl. ........................................... 713/1
[58] Field of Search ................... 395/651, 652, 395/653, 701, 702, 703; 713/1, 2, 100

[56] References Cited

U.S. PATENT DOCUMENTS 5,182,807  1/1993  Mizuse et al. .................. 395/700
5,572,727  11/1996 Larsson et al. ................. 395/616
5,701,502  12/1997 Baker et al. .................... 395/800
5,724,556  3/1998  Souder et al. .................. 395/500

FOREIGN PATENT DOCUMENTS 0 321 000    6/1989  European Pat. Off. .
WO 89/12274 12/1989  WIPO .

OTHER PUBLICATIONS

William S. Davis, Operating systems a systematic view, copyright 1983 by Addison–Wesley Publishing Company, Inc. (P.127–P.144) 1983.

*Primary Examiner*—Joseph E. Palys
*Assistant Examiner*—Omar A. Omar
*Attorney, Agent, or Firm*—Hill & Simpson

[57] ABSTRACT

The program system of a complex computer system is highly customer-specific, for which reason the start-up varies considerably. The start-up system of such a computer system must therefore be very flexible. On the other hand, however, early and close monitoring of the complex start-up should be ensured. These requirements are satisfied by a start-up system which has a start-up table generated off-line.

8 Claims, 5 Drawing Sheets

— message
······· high-level send
═══ contribution
1   message 'SP locally reached'
2   acknowledgement for message 'SP locally reached'
3   message 'SP globally reached'
4   acknowledgement for message 'SP globally reached'

START-UP SYSTEM OF A COMPUTER SYSTEM

BACKGROUND OF THE INVENTION

During the start-up (recovery) of complex computer systems, for example telephone switching systems, numerous processors and large quantities of software (that is to say the program system of the computer system) have to be put into operation. Since the program system of a complex computer system is highly customer-specific, the start-up varies very considerably from computer system to computer system.

Hitherto, therefore, the start-up tables for defining the customer-specific start-up have been generated dynamically. However, on account of this dynamic generation, a design of the start-up at an early point in time is not possible. In addition, the dependencies between the individual software parts can only be recognized when the tables have been built up completely online.

SUMMARY OF THE INVENTION

It is an object of the invention, on the one hand, to obtain earlier and more intense monitoring of the overall sequence of the start-up and, on the other hand, nevertheless to keep the start-up flexible, that is to say variable for the different customer-specific application program systems.

In addition, the start-up of the entire system should be performed reliably and rapidly.

According to the start-up system of the invention for a computer system, at least one start-up table which defines a start-up of a program system is provided. start-up control programs which control the start-up using start-up information contained in the at least one start-up table are provided. The start-up table is generated off-line from start-up information that has been declared in software components of the program system at their design time.

In a method of the invention for defining start-up of a computer system, in a software component of a component pool of the computer system, at its design time, start-up relationships for integrating the software component into overall start-up of the computer system are declared. From software components which are selected from the component pool for a customer-specific program system of a real-time system, the start-up table is generated off-line which defines overall start-up of the real-time system and is used by start-up control programs on-line for controlling the start-up.

By means of the static generation of the tables, early and close monitoring of the overall sequence of the start-up is enabled, and a reliable and rapid start-up is ensured.

As a result of the possibility of early monitoring, it is possible for errors (for example deadlocks) to be recognized and corrected by appropriate tools even before the on-line testing phase, that is to say even before the actual start-up of the real-time system.

By virtue of the fact that the start-up relationships (start-up information) for a software component are in each case declared in the latter, in the statically generated start-up table in each case only that software which is in each case present in the customer-specific program system is taken into account.

Furthermore, as a result a fine modularization of the start-up and hence independence and flexibility of the software component pool with respect to changes and/or expansions is promoted.

Finally, by means of the declaration of the start-up relationships in the software components, dependences between the parts of the start-up software become visible even before the actual start-up, which makes the design of the overall start-up easier.

In a further embodiment of the invention, the start-up table comprises a table formed of a plurality of partial start-up tables, the partial table in each case being produced as a result of compiling start-up related declarations of a software component. According to this embodiment of the invention, following the compilation of a software component, a partial table is already present which—made visible via an appropriate tool—can already be monitored at the design time.

In another embodiment of the invention, within the table it is defined whether, in order to satisfy a condition, a synchronization over process boundaries is intended to be carried out. This embodiment makes it possible to define, within the tables, whether a synchronization going beyond platforms is intended to take place or not. This makes it possible to define system states going beyond platforms in the overall system or in parts of the system. On one platform, it is therefore possible to wait for a system state which is provided by another platform. Expressed in other words, this means that dependences between the various parts of the software on the various computers of the real-time system can now already be taken into account in a simple way at the design time.

In a further embodiment of the invention, the user software can also define its start-up itself, with the aid of the tables. As a result of this embodiment, the start-up becomes significantly finer and more flexible than previously with respect to the user software. User software runs only if it has something to do with the start-up. Hence the start-up becomes more rapid and more stable.

An exemplary embodiment of the invention is explained in more detail in the following text, using the drawings.

DESCRIPTION OF THE PREFERRED EMBODIMENTS

An explanation will now be given of the expressions often used in the following text.

Start-up (recovery):

Relates to techniques in order to produce, following the occurrence of an error, following a power failure, during commissioning, etc., a state of the hardware and software that is suitable for the execution of the application program system.

Application Program System (APS):

An application program system contains all the programs and data which are needed in a computer system, for example a switching center (initial program load programs of the real-time system are excluded). For each complex computer system, an individual application program system (customer-specific APS), that is to say one tailor-made to the use-specific features of the relevant computer system, is required. The application program system constitutes an already bound program system in machine language.

Service Provision Unit, Capsule:

The software at the programming language level is structured in modules. In Chill, modules which are closely related to one another are combined into larger software components, socalled service provision units (SPU). The SPU constitutes that software unit which in each case is translated by the compiler. Capsules constitute those software units which can be loaded into the real-time system and, during the production time of the application program system, are formed by the builder from service provision units.

Software Component Pool:

The software component pool comprises the totality of the (source-code) software components, from which in each case a part is compiled and bound together in order to generate a customer-specific APS.

Start-up Control Programs:

The start-up control programs control the start-up and are also designated by the abbreviation SUPO in the following text. The start-up control programs comprise a start-up part (SUPO_SYNC), which runs in the operating system mode (supervisor mode), and a start-up part (SUPO_PROCESS), which runs in the user mode and is implemented as a process.

There follows next a brief overall description of the invention.

The invention is based on the object, on the one hand, to obtain early and close monitoring of the overall sequence of the start-up, and on the other hand to keep the overall start-up flexible, that is to say independent of the features of the customer-specific APS.

In order to achieve this object, the entire software production is integrated into the new start-up concept. As early as the design time, the software developers must declare subprograms (SPs) in the form of relationships (conditions and contributions) to other synchronization points and actions to be executed. These declarations are carried out in the software components designed in each case by the developers.

As a result of the compilation, a partial table is generated from the SP declarations.

As a result of the binding of the software component during the production time of the customer-specific application program system, these partial tables are finally joined to form a distributed table (from a logical point of view, a single table). This joining is performed with the aid of a specific tool in accordance with the relationships to other SPs declared in the software components (service provision units or, put more precisely, the modules contained therein).

The start-up control programs then access these tables, which are generated and joined off-line, in order to execute the start-up in accordance with the start-up information contained in the tables.

With the aid of the start-up tables generated off-line, it is made possible to keep the start-up control programs independent of the features of the application program system. The start-up control programs therefore have to be changed only if the start-up itself is intended to receive new features.

With respect to the application program system, the start-up control programs are, however, completely independent. This independence results quite simply from the fact that the start-up synchronization information is prescribed by the individual components of the application program system itself, and are incorporated off-line in the start-up control tables.

By means of the start-up, a real-time system is started step by step, each step representing a stable state. In the following text, these states are also designated synchronization points. Some of them have only local significance, while others in turn have a system wide significance. The range of significance depends entirely on the description level at which the synchronization points are situated.

Figure 1:
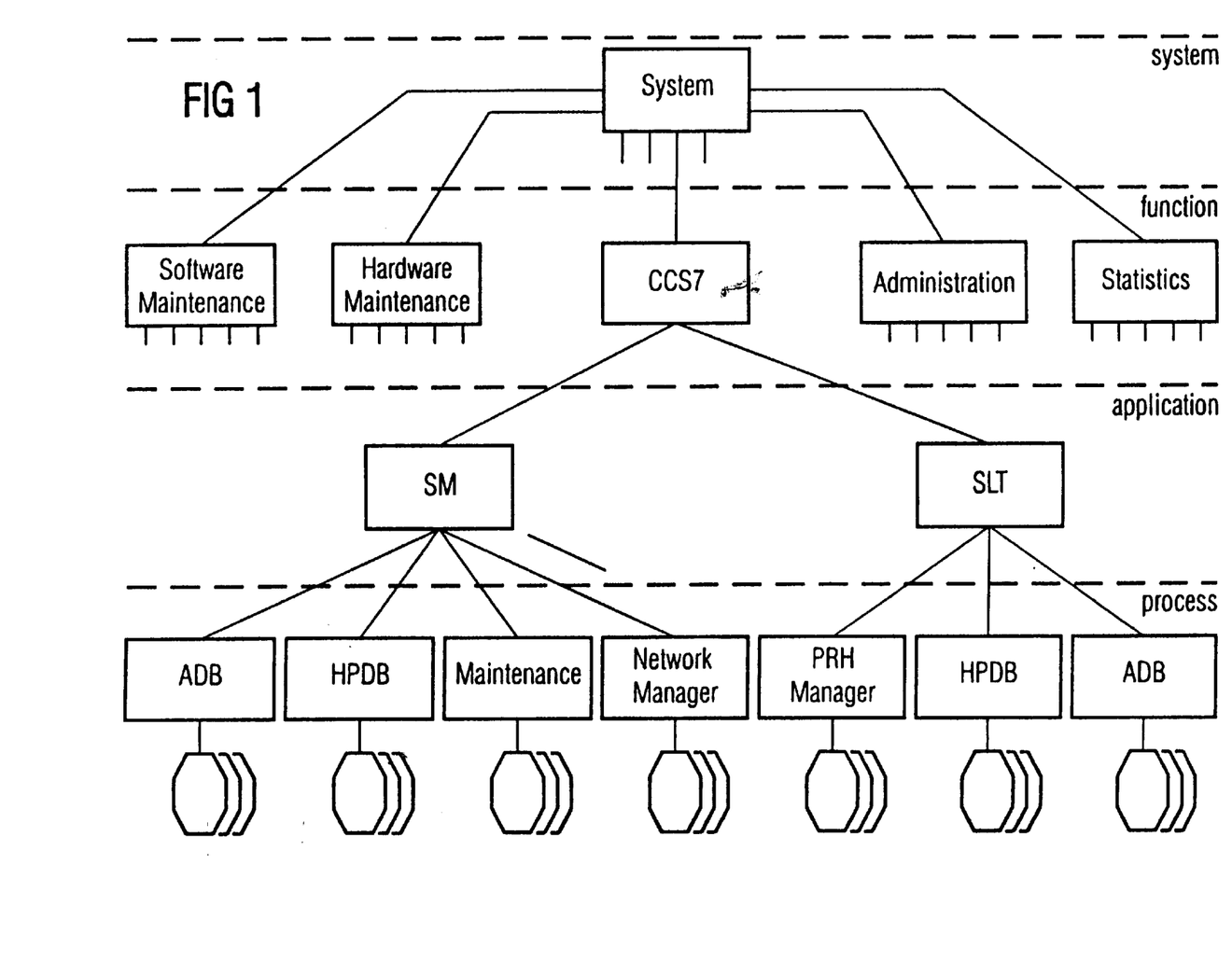
FIG. 1 is a block diagram showing hierarchical levels of start-up segments of an exemplary telephone switching system.

FIG. 1 shows the (hierarchical) levels of the start-up segments of an exemplary telephone switching system, namely a system level, a function level, an application level and a user level.

The start-up of the application program system is performed using the complete table, that is to say all the start-up segments. At the various hierarchical levels of the start-up segments, in each case the point of view of the description is different, that is to say at the uppermost level the start-up segments describe the overall system, but only very globally, and the further one moves downward in the hierarchical levels, the more detailed the description becomes, but in each start-up segment the amount of software described decreases. At the lowest level, it is only the interplay of individual processes of an SPU that is described, but this is done completely, that is to say it is possible here to recognize the relationships between individual processes.

At the system level (stage 1), the interplay of the individual software function complexes during the start-up is described. This level contains synchronization points which define the start-up of the overall application program system. These SPs constitute a coordinate grid into which the remaining software is hooked.

The function level (stage 2) describes the start-up for components which relate to significant function complexes of the system, such as hardware maintenance, software maintenance, CCS7, which likewise have a system-wide significance.

The application level describes the start-up for functional components (some of them still having a global significance); in the case of CCS7, a signalling manager SM and a signalling link terminal SLT may be mentioned as examples of such functional components.

The process level (hierarchical level 4) describes the start-up for the process software of the application program system, which is also designated user software in the following text. An application data base ADB, a high performance data base HPDB and a protocol handler manager (PRH manager) may be mentioned as examples of components at the process level.

Each start-up segment of a software component contains a list of synchronization points, each synchronization point essentially containing two classes of start-up information (relationship information).

One class of relationship information concerns socalled "actions". These "actions" constitute a description of those activities which have to be carried out as soon as the system state represented by the synchronization point has been reached.

The other class of relationship information concerns "preconditions" which have to be satisfied.

The relationships between SPs in each case contain two components:

1) a part which describes, in the one SP, that this SP (the one SP) supplies a contribution to another SP, and 2) a part which describes, in the other SP, that this SP (the other SP) must wait for the precondition of the one SP.

For instance, if a relationship between two SPs is to be defined (SP_x and SP_y), SP_x having to be reached before SP_y, then there are two components for this relationship:
1) it says at SP_x that SP_x is to make a contribution to SP_y (this appears in the "actions" of SP_x).
2) it says at SP_y, that SP_y must wait for a contribution from SP_x (this appears in the "preconditions" of SP_y).

Both classes of relationship information (actions and preconditions) comprise a mixture: they contain process-related parts and segment-related parts:
1) Actions:
   a) Segment component:
      contributions to other SPs
   b) Process component:
      starting processes
      continuing postponed (suspended) processes
      informing processes (via a message)
2) Preconditions:
   a) Segment component:
      "wait" for contributions from other SPs
   b) Process component:
      "wait" for contributions from processes Relationship information relating to other synchronization points is defined by appropriate statements within the definition of a synchronization point.

In order to avoid an excessively complex relationship structure between the start-up segments, the SPs contained in one segment may relate only to synchronization points of other segments having a stage difference of a maximum of one hierarchical level.

In order to integrate the processes administered by the operating system, which are also designated user processes in the following text, in the start-up, the user software programmer first likewise defines one or more start-up segments in a service provision unit, which contains the process or processes to be integrated, and logically links the start-up segments by means of appropriate logical linking statements (relationship statements) with the start-up segments of the application hierarchy level. Furthermore, the user must specify the relationship of his processes to the user start-up segments by announcing his processes, the announcement information in each case relating to one SP. The announcement information comprises the statement as to which synchronization point within one of the user start-up segments is used in order to start a user process, and for which synchronization point the process supplies a contribution. Said announcement information at the process level will be explained in more detail later.

The structure of the start-up tables, as well as the information contained therein, will be explained in more detail in the following text, before the use of the start-up tables by the SUPO is then explained in more detail.

Figure 2:
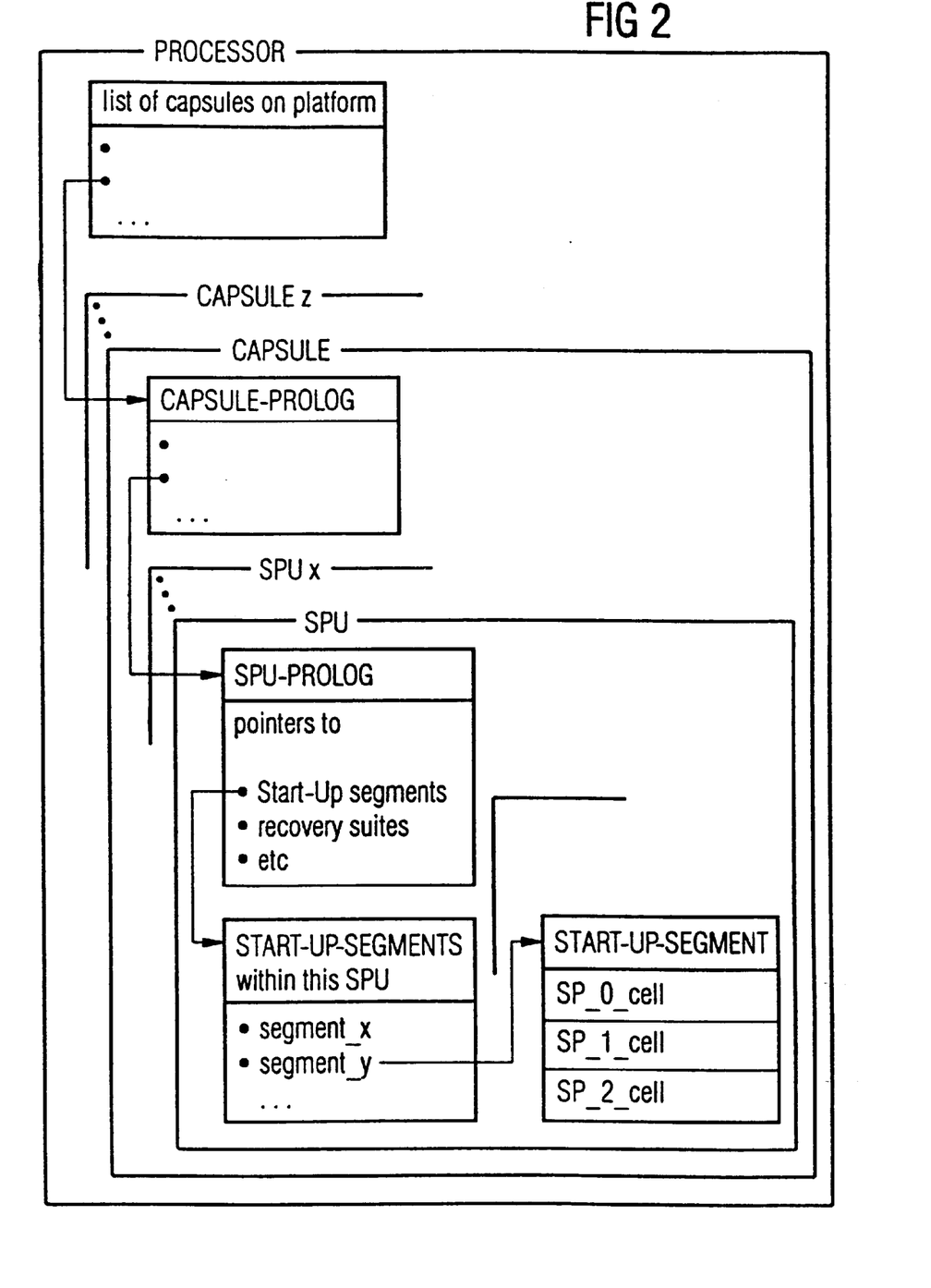
FIG. 2 is a block diagram showing structure of the start-up tables within a processor.

FIG. 2 shows the structure of the start-up tables within a processor.

The start-up tables are distributed over the entire software platform of a processor, each service provision unit containing that part of start-up information which is relevant to this service provision unit in conjunction with the start-up.

The access to the start-up tables is performed via address information in the socalled "capsule prolog" and in the "SPU prolog". A segment of the start-up tables comprises a table of socalled synchronization point cells (SP cells), each SP cell representing a synchronization point within the segment. An SP cell in turn contains the description of the "relationships", which are logically linked with this synchronization point. FIG. 2 shows, by way of example, how a segment (Segment_y), which contains three synchronization points, is represented in the start-up tables.

The start-up information contained in the start-up tables is explained in more detail in the following text.

As already previously explained, the start-up segment is that unit in the start-up tables in which the actual start-up information, namely the synchronization point information, is contained in socalled SP cells.

For the purpose of the declaration (definition) of start-up segments, the following programming-language means, put more precisely data structures, can be used:

A "segment name" data structure, in order to define the identity of the segment. It comprises the capsule identifier (capsule ID), the service provision unit identifier (SPU ID) and the segment identifier (Segment ID), the segment identifier being a SET value of a SET data type.

A "segment stage" data structure, by means of which the hierarchical level within the start-up hierarchy can be defined, to which level the start-up segment belongs. The type of this data structure is likewise a SET data type. The value of this data structure, namely the hierarchical level, is used to check that, within the synchronization point information, no attempts have been made to transfer start-up information over more than one hierarchical stage.

A "synchronization point" data structure, by means of which a start-up state and hence a system state is defined. This data structure is subdivided into the data structures "SP name", "condition", "contributions", "timing of SP", "external SP" and "actions".

The "SP name" data structure serves for the identification of the SP and is of the type "SET".

By means of the "conditions" data structure, it is possible for preconditions (conditions) to be defined, which must be satisfied before a synchronization point is reached. Said conditions are expressed by reference being made to processes or other synchronization points.

Said conditions are only allowed in order to produce relationships in the upward direction of the hierarchical levels (for example an SP at hierarchical level 4 may refer to a synchronization point at hierarchical level 3).

Via the "contributions" data structure, contributions may be defined which, after the SP has been reached, are made to at least one other SP. Contributions are a component of "actions".

Expressed in other words, these "contributions" constitute, for a "higher-level" SP, conditions which have to be produced or satisfied by the lower-order synchronization point, before the higher-order SP can be reached.

Contributions are allowed only in the upward direction (that is to say a synchronization point at hierarchical level 3 may relate to a synchronization point at hierarchical level 2).

A relationship between SPs always comprises the two components already mentioned, namely the preconditions and the actions. The definition of a relationship is always performed proceeding from one of the synchronization partners, that is to say in the example cited previously, it is either described at SP_x that SP_x will make a contribution to SF_y, or it is described at SP_y that SP_y will wait for a contribution from SP_x. This means that at the time of the definition of a synchronization relationship, the latter is not yet complete, one half of the relationship is still missing. This half will be completed by the linker/off-line builder during the APS production.

The order of the SPs during the start-up is defined by the relationships between the SPs. In this case, the level of the segment hierarchy at which an SP is situated is totally unimportant. The hierarchical level is needed only in order to structure the SPs (and the start-up segments), that is to say in order that the overview of the SPs and their relationships is not lost.

The contributions of an SP to another SP also achieves precisely the same as is achieved by a "condition" of the other SP. Therefore, at the time of the definition of the synchronization relationships, one has a degree of freedom. This degree of freedom is used to achieve "feature independence"; the synchronization relationships are always defined by that SP which lies further down in the segment hierarchy. In the example cited previously, the definition would appear in the following way (presupposing that SP_x is situated at the higher hierarchical level):

SP_y defines a "condition" (wait_for), that is to say SP_y defines that SP_x must be reached before it.

Only by the two language means "contribution" and "condition", which are identical from the point of view of their effect, and the utilization of the degree of freedom, can start-up become "feature independent".

The "Timing_of_SP" data structure contains information which indicates the maximum time duration which a segment is allowed in order to advance from one synchronization point to the next synchronization point. If the synchronization point is not reached before the timer defined by this maximum time duration expires, a corresponding error condition is signalled by an appropriate flag.

The "External synchronization point" data structure indicates whether a message, which indicates that the local preconditions of this synchronization point are satisfied, is to be sent to the socalled parent platform. The parent platform is that platform which takes over the monitoring of the maintenance activities of the associated dependent platforms. The data structure thus serves for synchronization going beyond platforms and thus likewise constitutes an action to be carried out in conjunction with the synchronization point.

The synchronization message is intended to be sent only to the parent platform, not to all the adjacent platforms (these are quite unknown to the individual dependent platform and can only be read out from the DB, which is only loaded during running up).

Since the start-up information that can be declared in the start-up segments has been illustrated, that start-up information which is relevant to a user process, which is involved in the synchronized start-up, will now be explained.

The declarations of the start-up information for a process can in this case only relate to such synchronization points which are defined within that SPU to which the process belongs, that is to say within which the process has been declared.

The said declarations for a process are processed off-line, that is to say by the compiler and/or binder, in order to produce therefrom the information contained in the start-up tables.

The following declarations or start-up information generated therefrom are possible:

For a process, it is possible to define, by means of the declaration "Start_at_SP", when, that is to say upon reaching which SP, a process is intended to be started. This declaration effects an entry in a socalled start table, which is present for each synchronization point, and which lists the processes to be started at this SP. The declaration is performed within that module which contains the process to be started.

Furthermore, a process has the option of indicating that it wishes to be suspended until a specific synchronization point has been reached. This option is realized by means of the declaration of the operating system call "wait_for_SP", the operating system call (supervisory call, abbreviated SVC) having to contain, as transfer parameter, the statement of the specific SP.

Furthermore, a process can request to be informed when a specific synchronization point (within its SPU) has been reached. This is realized in two parts.

The first part (static part) is effected by a declaration on the basis of which, off-line, an entry is made in a "watch table" that is present for each SP and which receives the watch requests from the processes. The declaration is performed within that module which contains the process to be started.

The second part (dynamic part) is effected by means of the declaration of the operating system call "watch_for_SP" in the requesting process itself.

Finally, a process—after it has been started—may supply a contribution to a synchronization point and, by means of the declaration of the OS call "contribute_to SP", after its contribution to an SP has been made, may indicate that the contribution has been satisfied. This is once more realized in two parts.

The first part (static part) is effected by a declaration on the basis of which, off-line, an entry is made in a "contribution table" that is present for each SP, which receives the contribution indications from the processes. The declaration is performed within that module which contains the process to be started.

The second part (dynamic part) is effected by the operating system call "contribute_to_SP" in the indicating process itself.

In the case of "contrib to", these two parts are logically necessary:

the effect of the Table Announcement (static part, declaration) is that the associated SP waits for the contribution from the process.

with the OS call "contribute_to_SP", the process (after it has carried out the necessary actions) makes its contribution to the SP, that is to say using the OS call the process tells the start-up that its pre-conditions for the SP have been satisfied.

by contrast, the two parts of the "watch for" are logically not necessary; they are only necessary when the buffer IDs, with which messages can be sent, are not known off-line. In this case, assumed here, they must be communicated to start-up on-line; the static component for this reserves only the space needed by start-up in order that the buffer ID (not known off-line) can be entered.

The function of the start-up control programs SUPO_SYNC and SUPO_PROCESS will be explained in more detail in the following text.

The start-up control programs use the start-up tables (as already mentioned) in order to control the start-up. Put more precisely, they control the synchronized start-up by transferring SP cells from one state into the other.

The handling of the SPs is independent of the hierarchical level and the shell in which they are situated.

The distinction between SUPO_SYNC and SUPO_PROCESS is necessary because of the tasks which are connected with the SPs; in this case the same task for all the SPs is always executed by the same SUPO component.

The handling of the SPs is performed almost completely by SUPO_SYNC. SUPO_SYNC checks whether the pre-conditions have been satisfied and, if appropriate, carries out the actions (including the hooking of new "finished" SP cells into the "ready pool").

SUPO_PROCESS undertakes only the tasks which cannot be carried out in shell 3 of the APS:
- time-monitoring of the SPs
- message traffic to the parent platform in the case of external SPs
- initiating the initialization of the start-up table and starting the synchronization mechanism.

Figure 3:
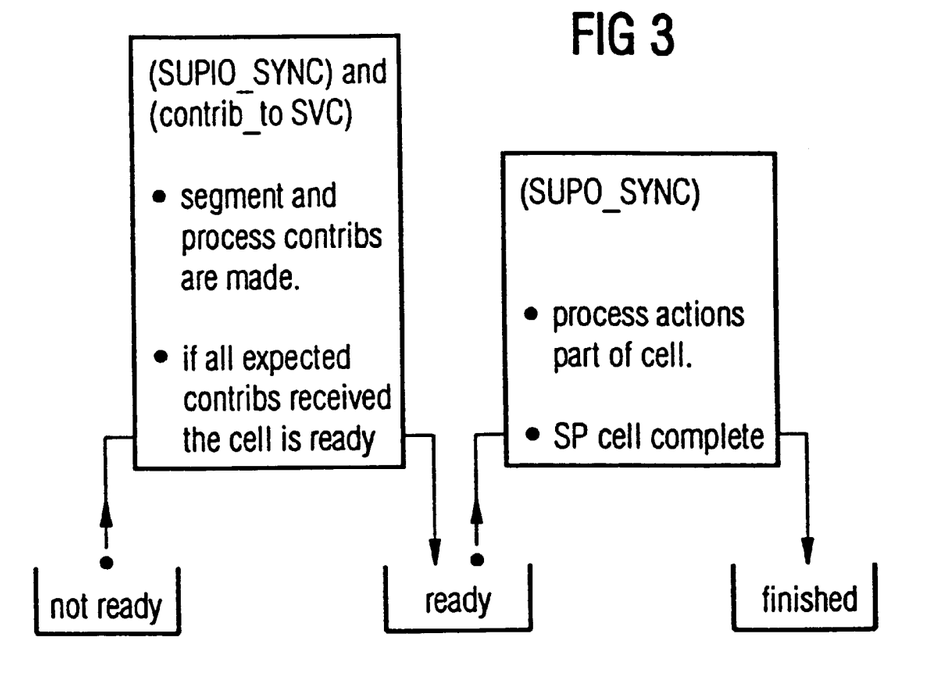
FIG. 3 is a block diagram describing three states which an SP cell can assume, and the manner in which transference of SP cells from one state into a next is performed.

FIG. 3 describes the three states which an SP cell can assume, and the manner in which the transference of the SP cells from one state into the next is performed.

The entire start-up procedure is initialized, in that the first SP cell is made ready for execution, that is to say is transferred into the "ready" state. This can be performed, for example, via a special interface.

On the basis of the relationships between the SFs, it is necessary only once for "the first" SP to be made "ready", that is to say it is not necessary (and must also not happen) that the first SP is made "ready" in every SPU. Instead, on the basis of the relationships between the "first SP" and other SPs, these become "ready" automatically, since the actions of the "first SP" contain contributions to other SPs, and the other SPs can become "ready" on the basis of the contributions. In the attached figure (FIG. 4), the "first SP" is the first SP in "SPU5".

Figure 4:
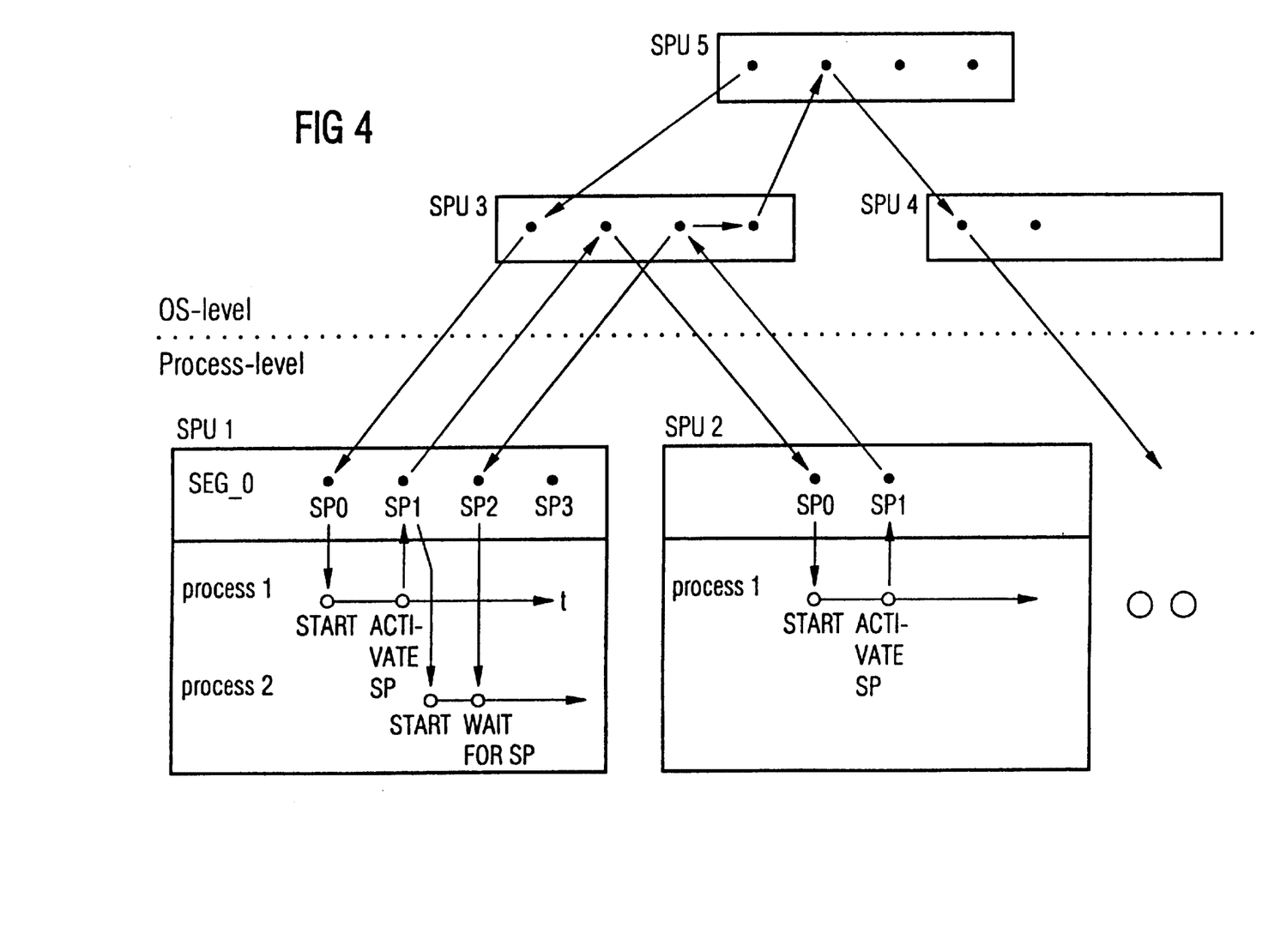
FIG. 4 is a block diagram illustrating an exemplary start-up involving the process level.

FIG. 4 illustrates an exemplary start-up involving the process level.

In every case when a process makes a contribution, SUPO_SYNC checks whether all the preconditions of the associated SP (to which the process makes its contribution) are satisfied (that is to say the mechanism is event-controlled).

If all the preconditions of an SP are satisfied, then the actions of the SP are executed (by SUPO_SYNC, still within the contribute_to_SVC):
- under certain circumstances, processes are started,
- messages are sent to processes,
- postponed processes are woken up once more and
- contributions to other SPs are made.

On the basis of these actions, further SPs can become "ready" still within the contribute_to_SVC (if, for the SPs to which contributions are made, all the preconditions are satisfied following the contribution). The actions of these SPs are likewise executed still within the contribute_to_SVC (and so on).

After the actions of all the SPs which are "ready" have been executed, this contribute_to_SVC is completed; a process is selected which starts to run (by the operating system).

As already described, each SP contains the information as to which preconditions have to be satisfied before the SP is "ready". The preconditions may comprise two components:

SPs which have to be reached previously:
This information is either defined directly at the SP (if it is waiting for an SP at a higher hierarchical level) or generated by the linker/off-line builder (if an SP of a lower hierarchical level thinks it has to be reached previously).

Contributions from processes:
The actual work during the running up is done by processes. Therefore, the contributions from the latter are particularly important.

As already described in 15), a contribution from a process comprises two components: a static and a dynamic component. The static component is in this case exclusively there in order that the associated SP "knows" that it must wait for a contribution from a specific process.

SP cells are transferred from the "non_ready pool" into the "ready pool", to be specific as the result of one of the following events a) and b):

a) SUPO_SYNC makes a contribution to an SP, which is situated in the "non-ready pool", at the segment level. After this contribution has been dealt with, SUPO_SYNC checks whether all the preconditions of the synchronization point have been satisfied. If so, then SUPO_SYNC transfers the SP cell into the "ready pool".

b) A process deals with a task which is relevant to the start-up and is therefore in the start-up table as a precondition for a specific SP, via the described declaration (or table announcement or static component of the process contribution). After this task has been dealt with, the process calls the contribute-to-SVC, within which the previously described actions proceed.

The transference of an SP cell from the "ready" state into the "finished" state is achieved by means of actions which are controlled by SUPO_SYNC.

The following actions can be carried out in conjunction with a synchronization point:
- a list of processes, which have to be started by the operating system in conjunction with the synchronization point,
- contributions which have to be made to other SP cells,
- a list of processes, which are waiting in a queue until this synchronization point is reached, are once more lined up in the "ready to run" queue,
- a standard message is sent to the buffers of all those processes which wish to be informed when this synchronization point has been reached.
- SP cells of a segment are moved by SUPO into the "ready pool". (When all the preconditions of the next synchronization point within the same segment have been satisfied, the next synchronization point of this segment is ready to be executed, and it is therefore moved into the "ready pool".)

When all said actions of a synchronization point have been executed, an appropriate flag is set within the SP cell.

In summary, it may be said that SUPO_SYNC effects the transference of an SP cell from the "ready" state into the "finished" state by taking the SP cell out of the ready pool. The order in which the SUPO_SYNC takes the SPs out of the pool is immaterial. All the SPs in the "ready pool" are reached, and the actions of all these SPs have to be executed.

In reality, the pools are realized as chains of SP cells. During the processing, a start is made in the chain at the front, and the next in the chain is always processed; new SPs are hooked into the chain at the back. This ensures that all the SPs are processed.

In addition, in reality there is no "not ready pool", and no "finished pool". These pools are replaced by flags in the SP cells, which flags indicate how many preconditions for an SP are still missing, or whether the actions of an SP have already been processed.

If there are no longer any SP cells in the ready pool, SUPO_SYNC no longer has any work, and must wait until a user process transfers an SP cell into the ready pool with the aid of the operating system call "contribute to SP".

When a synchronization point with external significance is reached, SUPO_SYNC does not immediately carry out the actions logically linked with this synchronization point, but causes SUPO_PROCESS to send a message to the parent platform, by means of which it is indicated to the latter that said SP has been reached on the platform sending the message, that is to say from a local point of view. At the same time, SUPO_SYNC delays the execution of the actions logically linked with this synchronization point until the message "SP globally reached" has been received from the parent platform via SUPO_PROCESS.

Figure 5:
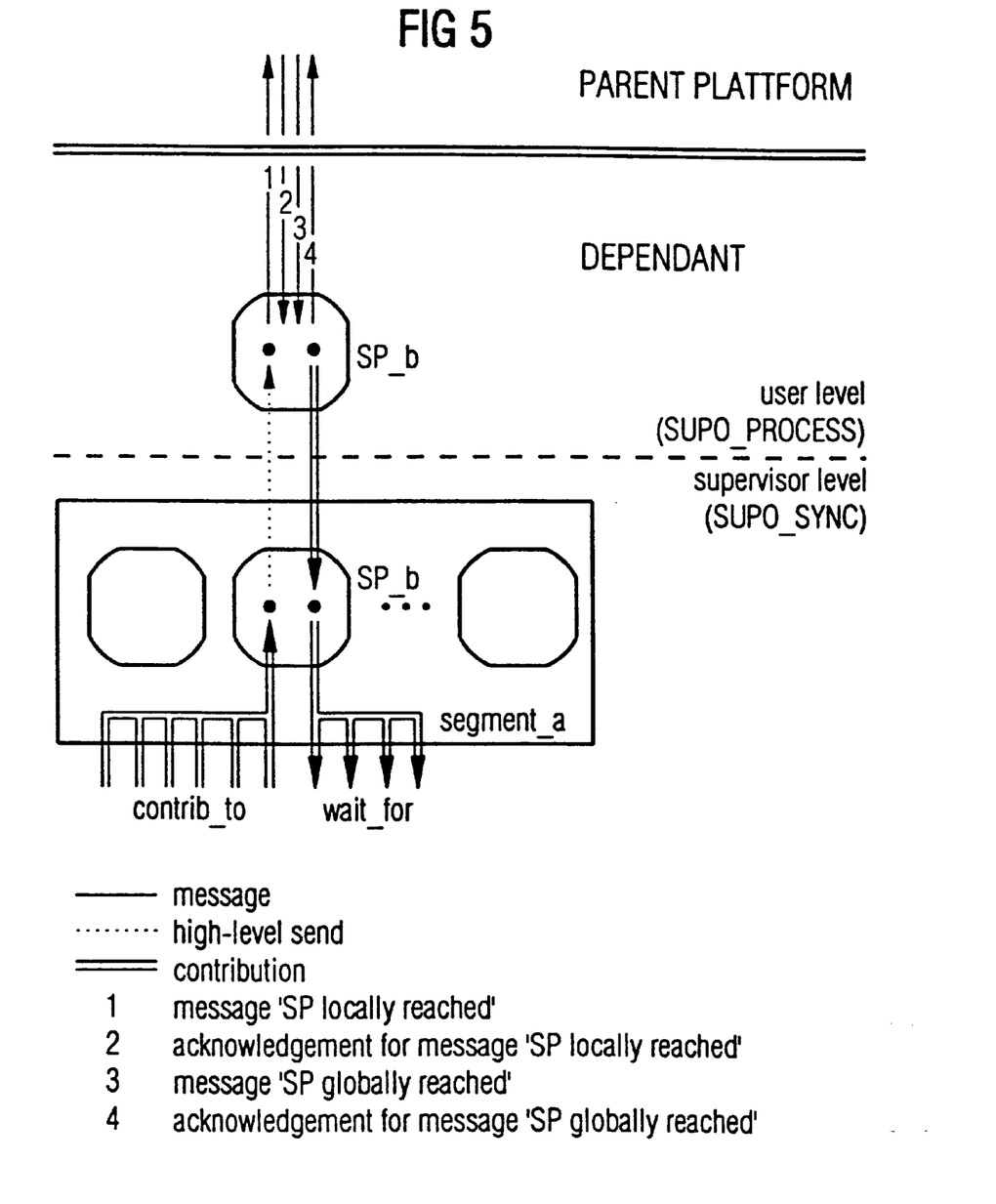
FIG. 5 is a block diagram clarifying how an external synchronization point may be considered as comprising two virtual synchronization points.

An external synchronization point may be considered as comprising two virtual synchronization points, which is clarified by FIG. 5.

The first virtual synchronization point within the segment_a comprises, in conjunction with the synchronization point being considered, all the (local) preconditions of the synchronization point, and a single action, namely the sending of a message ("SP locally reached") to the parent platform.

The second virtual synchronization point comprises the single precondition that the message "SP globally reached" has been received by the parent platform and in addition comprises all the remaining (local) actions of the synchronization point being considered.

In the following text, the start-up related operating system calls (supervisory calls, abbreviated SVC) of the user processes are explained in more detail:

All processes started by the operating system must declare when, that is to say at which synchronization point, they are intended to be started. As soon as this synchronization point has been reached, the processes to be started at this synchronization point are started by SUPO_SYNC. SUPO_SYNC starts all the incarnations of a process type.

The operating system call "contribute_to_SP", which is performed by the user processes, has parameters which indicate, on the one hand, the segment and the synchronization point (within that SPU which also contains the process) for which a contribution is to be made, and, on the other hand, whether the contribution is positive or negative, that is to say whether the contribution could be carried out or whether an error occurred.

SUPO_SYNC, after its call, uses the segment name and the specified synchronization point in order to make access to the corresponding SP cell for which a contribution is to be made. After this, the SP cell receives a time stamp in order to indicate that the contribution has been made and when it was made. When all the contributions expected by an SP cell have been made, the SP cell is ready to be executed, that is to say ready for the actions that are logically linked with the synchronization point to be executed. This manifests itself in the fact that the SP cell is transferred by SUPO_SYNC into the ready pool. Directly after this, that is to say within the context of the same call, all the actions that are logically linked with the synchronization point are executed under the control of SUPO_SYNC.

The operating system call "Wait_for_SP" is carried out by the user processes in order to suspend themselves until a specific synchronization point has been reached. The operating system call has parameters which specify the segment and the synchronization point (within the dedicated SPU).

The execution of the operating system call is in turn performed by SUPO, SUPO using routines granted by the operating system in order to link the suspended process (put more precisely, the process control block, abbreviated PCB) logically with a corresponding list within the operating system capsule. The place in the list is in turn logically linked with the synchronization point specified in the operating system call. When the synchronization point has been reached, the process is taken out of the list and transferred into the state "ready to run". In the event that the synchronization point has already been reached when the operating system call is executed, the process triggering the operating system call is of course not suspended.

The operating system call "Watch_for_SP" is carried out by a user process when it wishes to be informed about a synchronization point having been reached. The operating system call is necessary in order to inform SUPO about the buffer identifier of the user process, since this identifier is not known at the production time of the APS the buffer and hence the buffer identifier of a process is only generated at the run time).

The operating system call has the following parameters:
  the segment and the synchronization point (within the dedicated SPU) about which the user process wishes to be informed,
  the buffer identifier of the user process,
  a response parameter, which indicates to the user process whether the synchronization point was found and whether the buffer identifier could be appended to the list of buffer identifiers which receive messages when the synchronization point has been reached. If the response is negative, the message which indicates that the synchronization point has been reached is not sent to the user process.

The tools for off-line support for the start-up are explained in more detail in the following text.

The generation of the start-up tables requires the following means:
  declaration means (definition means), by which the start-up segments and the start-up information to be accommodated therein can be declared in a suitable way and
  table generation means, which generate start-up tables suitable for the SUPO using the start-up information described by the definition means.

Whereas said definition means have already been explained extensively, the table generation means will now be discussed in more detail.

In order to generate the start-up tables from the service provision units specified for a processor, the compiler firstly generates partial start-up tables (segment tables) from the segments contained in the service provision units. For this purpose, a special compilation sequence of the SPU modules and of the user modules is necessary. In addition, the compiler binds the segment tables of a service provision unit with the SPU prolog.

Relationships between different segments are built up by the linker and off-line builder. In the process, the information that is necessary in this respect is appended to the segment tables.

On the basis of said table generation means, the start-up tables are already available before the last APS load generation. The overall sequence of the start-up can therefore already be checked at this point in time by means of appropriate checking tools. These checking means can, for example, check the start-up tables for consistency (deadlocks etc.), carry out an analysis with respect to critical paths within the overall sequence, and identify bottlenecks and critical time paths. As a result, the (overall) start-up table can be optimized early.

Finally, with the aid of an indicating means, the (overall) start-up table can be made visible to the developer in the form of a corresponding start-up plan. As a result, the developer can more easily discover errors.

Although various minor changes and modifications might be proposed by those skilled in the art, it will be understood that our wish is to include within the claims of the patent warranted hereon all such changes and modifications as reasonably come within our contribution to the art.

We claim as our invention:

1. A start-up system of a computer system, comprising:

at least one start-up table which defines a start-up of a program system;

start-up control programs which control the start-up using start-up information contained in the at least one start-up table; and the start-up table being generated off-line from start-up information that has been declared in software components of the program system at their design time.

2. The start-up system of claim 1 wherein the start-up table comprises a table formed of a plurality of partial start-up tables, the partial table in each case being produced as a result of compiling start-up related declarations of a software component.

3. The start-up system of claim 2 wherein different partial tables are joined together by production tools, which are used for the production of the program system, to form a complete table.

4. The start-up system of claim 1 wherein within the table it is defined whether, in order to satisfy a condition, a synchronization over processor boundaries is intended to be carried out.

5. The start-up system of claim 1 wherein user software of the program system can also define its start-up itself, with the aid of the tables.

6. The start-up system of claim 1 wherein the computer system is a real-time system, and wherein the tables define the start-up such that, on the one hand, they define system states with a prescribed sequence and, on the other hand, actions which are intended to be carried out after a respective system state has been reached.

7. The start-up system of claim 6 wherein the tables define system states in that they define conditions such that when the conditions are satisfied, a system state counts as being reached.

8. A method for defining start-up of a computer system, comprising the steps of:

in a software component of a component pool of the computer system, at its design time, declaring start-up relationships for integrating the software component into overall start-up of the computer system; and from software components which are selected from the component pool for a customer specific program system of a real-time system, generating a start-up table off-line which defines overall start-up of the real-time system and is used by start-up control programs on-line for controlling the start-up.

* * * * *